United States Patent
Fujita

(10) Patent No.: US 7,380,634 B2
(45) Date of Patent: Jun. 3, 2008

(54) ELECTRIC POWER STEERING APPARATUS FOR VEHICLE AND METHOD FOR INSTALLING THE SAME ON VEHICLE

(75) Inventor: Shuji Fujita, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 520 days.

(21) Appl. No.: 10/543,420

(22) PCT Filed: Apr. 22, 2004

(86) PCT No.: PCT/JP2004/005814

§ 371 (c)(1),
(2), (4) Date: Jul. 26, 2005

(87) PCT Pub. No.: WO2004/106142

PCT Pub. Date: Dec. 9, 2004

(65) Prior Publication Data

US 2006/0096801 A1    May 11, 2006

(30) Foreign Application Priority Data

May 28, 2003   (JP)   ............................. 2003-151424

(51) Int. Cl.
*B62D 5/04* (2006.01)
(52) U.S. Cl. ........................................ 180/444; 318/432
(58) Field of Classification Search ................ 180/443, 180/444; 318/432
See application file for complete search history.

(56) References Cited

U.S. PATENT DOCUMENTS

| 7,266,069 | B2* | 9/2007 | Chu | ......................... 369/53.35 |
| 7,295,907 | B2* | 11/2007 | Lu et al. | ....................... 701/41 |
| 2001/0053952 | A1* | 12/2001 | Kodaka et al. | ................ 701/43 |

FOREIGN PATENT DOCUMENTS

| DE | 101 42 388 A1 | 5/2002 |
| FR | 2 608 120 A1 | 6/1988 |
| GB | 2 375 334 A | 11/2002 |
| JP | A 2001-315655 | 11/2001 |
| JP | A 2001-328548 | 11/2001 |
| JP | A 2001-354146 | 12/2001 |

* cited by examiner

*Primary Examiner*—Tony H. Winner
(74) *Attorney, Agent, or Firm*—Oliff & Berridge, PLC

(57) ABSTRACT

When the disclosed electric power steering apparatus designed for use in a right/left-hand-drive vehicle is installed on a left/right-hand-drive vehicle, methods of (1) mirror-reversing the apparatus except for the rotation angle sensor; arranging the sensor in a consistent direction relative to the rack/column shaft; and counterchanging V and W phases of the motor, or (2) mirror-reversing the apparatus except for the rotation angle sensor; arranging the sensor in a consistent direction relative to the rack/column shaft with +120° (or +240°) offset relative to the motor; and counterchanging U and V (or U and W) phases of the motor, are performed.

10 Claims, 11 Drawing Sheets

ELECTRIC POWER STEERING APPARATUS FOR VEHICLE AND METHOD FOR INSTALLING THE SAME ON VEHICLE

TECHNICAL FIELD

This invention relates generally to an electric power steering apparatus and a method for installing the same on a vehicle, and more particularly to such apparatus and method that enable an electrical control unit for use in the apparatus to be common between when installing it on a right-hand-drive vehicle and on a left-hand-drive vehicle, or, between when installing the apparatus on a vehicle of which steering gear box is located forward of a central wheel axis and rearward of it.

BACKGROUND ART

Conventionally, when installing the electric power steering apparatus on the vehicle, the arrangement of each component thereof is mirror-reversed with a longitudinal centerline of the vehicle as an axis between when installed on a right-hand-drive vehicle and on a left-hand-drive vehicle. Arranging in such manner is hereinafter referred to as a mirror-reversed arrangement.

Then, due to the mirror-reversed arrangement, the correspondence between direction of rotation of a steering handle and direction of rotation of the electric motor for generating assist force is reversed. Therefore, it is necessary to change the content (software) of a control unit (e.g., ECU) for controlling the power supply to the electric motor.

This is described in more detail with reference to FIGS. 1 and 2. FIG. 1 shows the electric power steering apparatus carried on the right-hand-drive vehicle. Turning operation of a steering handle 101 by a driver is transferred to a rack shaft 104 through a steering axis 102 and a pinion part 103.

The rack shaft 104 is coaxially provided with an electric motor 105 for assisting lateral (axial) movement of the rack shaft 104 and with a rotation angle sensor 106 for detecting the rotation angle of the electric motor 105. The electric motor 105 shall be provided with a right-handed reduction gear (not shown) in this context.

A steering torque sensor 107 is provided on the middle of the steering axis 102. The steering torque detected by the steering torque sensor 107 is transferred to an ECU 108 for controlling the power supply to the electric motor 105. The ECU 108 is configured to control the rotation of the electric motor 105 in accordance with the direction and amount of steering torque (i.e., with the direction and amount of steering operation) to generate the assist force depending on the steering torque.

Now, it is assumed for the steering handle 101 that turning to the left (in the counterclockwise direction) from the driver's standpoint is defined as turning in a forward (+) direction and that turning to the right (in the clockwise direction) from the driver's standpoint is defined as turning in a reverse (−) direction. Further, it is assumed for the direction of rotation of the motor that the direction of rotation in which the motor generates an assist force to push the rack shaft 104 to the left is defined as a forward (+) direction and that the direction of rotation in which the motor generates an assist force to push the rack shaft 104 to the right is defined as a reverse (−) direction.

Thus, in an example shown in FIG. 1, the ECU 108 for controlling the power supply to the electric motor 105 is programmed to rotate the electric motor 105 in the forward (+) direction when the direction of steering torque is forward (+) and to rotate the electric motor 105 in the reverse (−) direction when the direction of steering torque is reverse (−).

FIG. 2 shows the above-described electric power steering apparatus installed on a left-hand-drive vehicle with mirror-reversed arrangement. The same components have a consistent reference number.

As shown, the correspondence of the direction of steering to the direction of rotation of the motor is reversed due to the mirror-reversed arrangement. Therefore, when the ECU 108 controls the power supply to the electric motor 105 in a similar manner as in when installed on a right-hand-drive vehicle (i.e., the ECU 108 is carrying the same software for control as in when installed on the right-hand-drive vehicle), the rack shaft 104 is assisted to move to the right when steering to the left and assisted to move to the left when steering to the right. Briefly, the rack shaft 104 is assisted in incorrect directions.

Consequently, the program installed on ECU 108 has to be changed when the above electric power steering apparatus is installed on the left-hand-drive vehicle, such that the ECU 108 is programmed to rotate the electric motor 105 in the reverse (−) direction when the steering torque is in the forward (+) direction and to rotate the electric motor 105 in the forward (+) direction when the steering torque is in the reverse (−) direction.

Practically, various methods can be employed for this, including (1) two types of ECUs for use in the right-hand-drive vehicle and in the left-hand-drive vehicle are prepared and installed appropriately in a manufacturing process, or (2) two types of software for use in the right-hand-drive vehicle and in the left-hand-drive vehicle are installed on the ECU and an appropriate one is selected to use by obtaining information on the steering handle from the vehicle after the installation.

However, with a conventional method like the above (1), incorrect installation may happen since the ECUs for use in the right-hand-drive vehicle and in the left-hand-drive vehicle generally have the identical shape in appearance. Once an incorrect ECU is installed, the steering handle oscillates and it is impossible to steer properly. More particularly, it is difficult for the driver even to steer such vehicle because the rack shaft is assisted in the opposite directions. Therefore, it is difficult for the driver to drive such vehicle even from the exit of the manufacturing line to a place for repair and part replacement.

Also, with the above (2) method, it is impossible to control the vehicle when an EEPROM for loading the information about the steering handle from the vehicle fails.

DISCLOSURE OF THE INVENTION

It is a main object of this invention to provide the electric power steering apparatus for a vehicle and the method for installing the same on a vehicle in which a common ECU for controlling the power supply to the electric motor for generating the assist force can be employed when installed on the right-hand-drive vehicle and on the left-hand-drive vehicle.

By the way, the above-mentioned problem can happen not only between the right-hand-drive vehicle and the left-hand-drive vehicle, but also between a vehicle of which the steering gearbox is located forward of the central wheel axis and a vehicle of which the steering gearbox is located rearward of the central wheel axis. Therefore, it is also an object of this invention to provide the electric power steering apparatus for a vehicle and the method for installing the same on a vehicle in which a common ECU for controlling the power supply to the electric motor for generating the assist force can be employed when installed on the vehicle of which steering gearbox is located forward of the central wheel axis and on the vehicle of which steering gearbox is located rearward of the central wheel axis.

A first aspect of this invention to achieve the above object is a method for installing an electric power steering apparatus on a left/right-hand-drive vehicle, the apparatus comprising a three-phase electric motor for generating an assist force for a turning operation of a steering handle to a rack/column shaft; a rotation angle sensor for detecting rotation angle of the motor; and an electrical control unit (e.g., ECU) for controlling the power supply to the motor, the apparatus being installed on the left/right-hand-drive vehicle when the electrical control unit is designed for use in the right/left-hand-drive vehicle respectively, comprising the steps of:

(1) mirror-reversing and arranging the apparatus except for the rotation angle sensor; arranging the rotation angle sensor in a consistent direction relative to the rack/column shaft where the motor generates the assist force; and counterchanging the electric lines for V and W phases of the motor before connecting, or (2) mirror-reversing and arranging the apparatus except for the rotation angle sensor; arranging the rotation angle sensor in a consistent direction relative to the rack/column shaft where the motor generates the assist force with +120° offset relative to the motor; and counterchanging the electric lines for U and V phases of the motor before connecting, or (3) mirror-reversing and arranging the apparatus except for the rotation angle sensor; arranging the rotation angle sensor in a consistent direction relative to the rack/column shaft where the motor generates the assist force with +240° offset relative to the motor; and counterchanging the electric lines for U and W phases of the motor before connecting.

A second aspect of this invention to achieve the above object is a method for installing an electric power steering apparatus on a left/right-hand-drive vehicle, the apparatus comprising an electric motor for generating assist force for a turning operation of a steering handle to a rack/column shaft; and an electrical control unit (e.g., ECU) for controlling the power supply to the motor, the apparatus being installed on the left/right-hand-drive vehicle when the electrical control unit is designed for use in the right/left-hand-drive vehicle, respectively, comprising the steps of: mirror-reversing and arranging the apparatus; and replacing a reduction gear provided on the motor with another one being opposite-handed.

A third aspect of this invention to achieve the above object is a method for installing an electric power steering apparatus on a left/right-hand-drive vehicle, the apparatus comprising an electric motor for generating assist force for a turning operation of a steering handle to a rack/column shaft; a torsion bar mounted on a shaft for transferring the turning operation of the steering handle and configured to be twisted by the turning operation; and upper and lower angle sensors mounted on an upper side and on a lower side of the torsion bar, respectively, and configured to detect absolute angles and transfer them to the electric control unit, the apparatus being installed on the left/right-hand-drive vehicle when the electrical control unit is designed for use in the right/left-hand-drive vehicle, respectively, comprising the steps of: mirror-reversing and arranging the apparatus; and counterchanging an electric line connecting the upper angle sensor and the electric control unit and an electric line connecting the lower angle sensor and the electric control unit.

A fourth aspect of this invention to achieve the above object is a method for installing an electric power steering apparatus on a vehicle of which gearbox is located forward/rearward of the central wheel axis, the apparatus comprising a three-phase electric motor for generating an assist force for a turning operation of a steering handle to a rack/column shaft; a rotation angle sensor for detecting rotation angle of the motor; and an electrical control unit (e.g., ECU) for controlling the power supply to the motor, the apparatus being installed on a vehicle of which gearbox is located forward/rearward of the central wheel axis when the electrical control unit is designed for use in the vehicle of which gearbox is located rearward/forward of the central wheel axis, respectively, comprising the steps of:

(1) mirror-reversing and arranging the apparatus except for the rotation angle sensor; arranging the rotation angle sensor in a consistent direction relative to the rack/column shaft where the motor generates the assist force; and counterchanging the electric lines for V and W phases of the motor before connecting, or (2) mirror-reversing and arranging the apparatus except for the rotation angle sensor; arranging the rotation angle sensor in a consistent direction relative to the rack/column shaft where the motor generates the assist force with +120° offset relative to the motor; and counterchanging the electric lines for U and V phases of the motor before connecting, or (3) mirror-reversing and arranging the apparatus except for the rotation angle sensor; arranging the rotation angle sensor in a consistent direction relative to the rack/column shaft where the motor generates the assist force with +240° offset relative to the motor; and counterchanging the electric lines for U and W phases of the motor before connecting.

A fifth aspect of this invention to achieve the above object is a method for installing an electric power steering apparatus on a vehicle of which gearbox is located forward/rearward of the central wheel axis, the apparatus comprising an electric motor for generating an assist force for a turning operation of a steering handle to a rack/column shaft; and an electrical control unit (e.g., ECU) for controlling the power supply to the motor, the apparatus being installed on a vehicle of which gearbox is located forward/rearward of the central wheel axis when the electrical control unit is designed for use in a vehicle of which gearbox is located rearward/forward of the central wheel axis, respectively, comprising the steps of: mirror-reversing and arranging the apparatus; and replacing a reduction gear provided on the motor with another one being opposite-handed.

A sixth aspect of this invention to achieve the above object is a method for installing an electric power steering apparatus on a vehicle of which gearbox is located forward/rearward of the central wheel axis, the apparatus comprising an electric motor for generating an assist force for a turning operation of a steering handle to a rack/column shaft; a torsion bar mounted on a shaft for transferring the turning operation of the steering handle and configured to be twisted by the turning operation; and upper and lower angle sensors mounted on an upper side and on a lower side of the torsion bar, respectively, and configured to detect absolute angles and transfer them to the electric control unit, the apparatus being installed on a vehicle of which gearbox is located forward/rearward of the central wheel axis when the electrical control unit is designed for use in a vehicle of which gearbox is located rearward/forward of the central wheel axis, respectively, comprising the steps of: mirror-reversing and arranging the apparatus; and counterchanging an electric line connecting the upper angle sensor and the electric control unit and an electric line connecting the lower angle sensor and the electric control unit.

A seventh aspect of this invention to achieve the above object is an electric power steering apparatus for a vehicle, wherein the apparatus is adapted to be installed on the vehicle in accordance with any of the methods as described in the above first through sixth aspects.

According to these aspects, the common electric control unit that controls the power supply to the electric motor for generating the assist force can be employed in the rack/column assist electric power steering apparatus between when installed on a right-hand-drive vehicle and on a left-hand-drive vehicle, or between when installed on a vehicle of which steering gear box is located forward of the central wheel axis and in the rearward of the central wheel axis.

BRIEF DESCRIPTION OF THE DRAWINGS

The foregoing and other objects, features, and advantages of the present invention will become apparent upon reading the following detailed description and upon reference to the drawings in which.

PREFERRED EMBODIMENTS FOR CARRYING OUT THE INVENTION

Embodiments 1-5 of the invention are now described with reference to the appended drawings. In the following description of the embodiments, the same components have a consistent reference number and redundant explanation is not repeated. Note that, in the following Embodiments 1-5, an exemplary case in which the rack assist electric power steering apparatus designed for use in a right-hand-drive vehicle is installed on a left-hand-drive vehicle, is described as an example.

Embodiment 1 of this invention is now described. In the installation method of this embodiment, when the electric power steering apparatus having the common ECU 108 is installed on the left-hand-drive vehicle, the reduction gear (e.g., a ball screw) provided on the electric motor 105 is replaced with an opposite-handed one. For example, in case of the reduction gear being right-handed, it is replaced with a left-handed reduction gear.

Upon replacing the reduction gear with the opposite-handed one, the direction of the assist force generated by rotation of the electric motor 105 becomes reversed. For example, in the example shown in FIG. 2, when the electric motor 105 rotates in the forward (+) direction, the rack shaft 104 is assisted to move to the left, and when the electric motor 105 rotates in the reverse (−) direction, the rack shaft 104 is assisted to move to the right.

Thus, according to this embodiment, the direction of assist reversed by the mirror-reversed arrangement can be again reversed to a proper direction by replacing the reduction gear with the opposite-handed one, so that the common ECU can be employed for both the right-hand-drive vehicle and the left-hand-drive vehicle.

Figure 1:
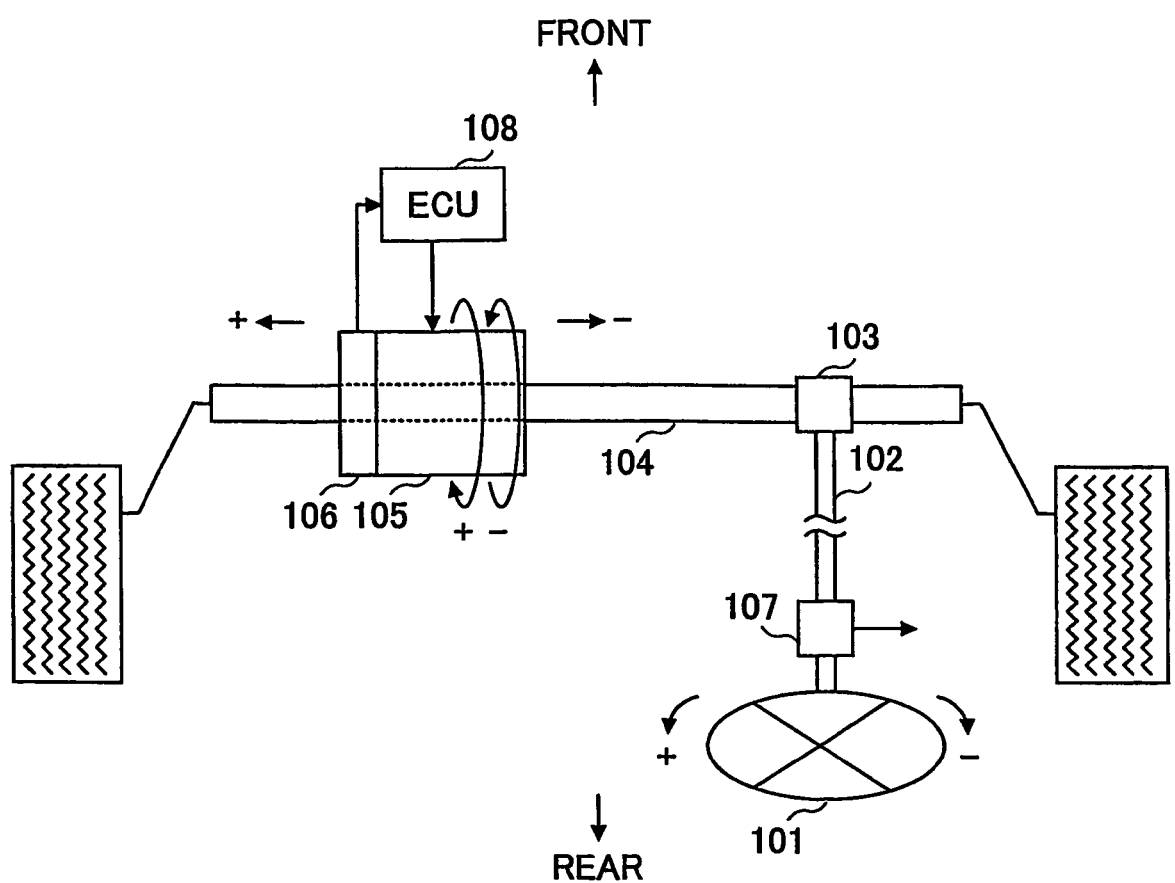
FIG. 1 is a schematic view showing the rack assist electric power steering apparatus installed on a right-hand-drive vehicle.
Figure 3A:
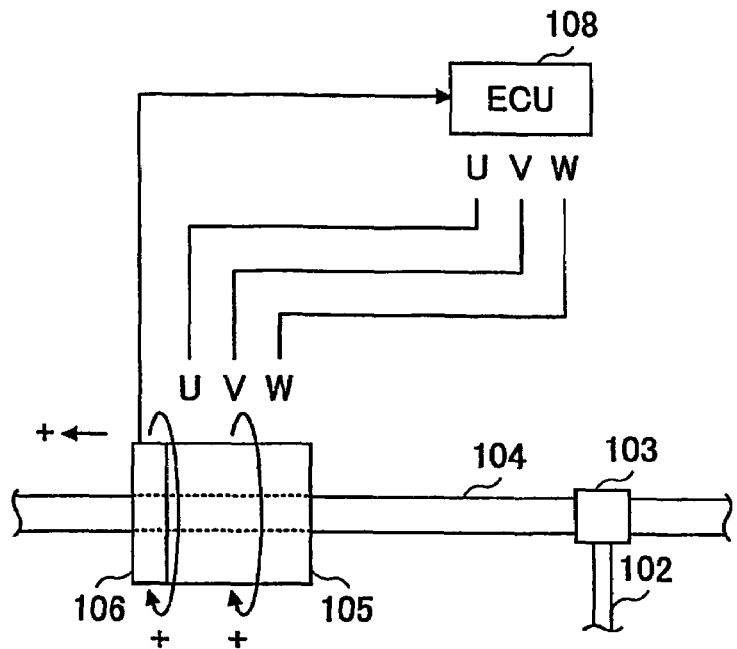
FIG. 3A is a partially enlarged view of FIG. 1.

Embodiment 2 of this invention is next described with reference to FIGS. 3 and 4. In the electric power steering apparatus of this embodiment, the electric motor 105 is a three-phase brushless motor with U phase, V phase, and W phase, as shown in FIG. 3A, which is the partially enlarged drawing of FIG. 1.

Figure 4:
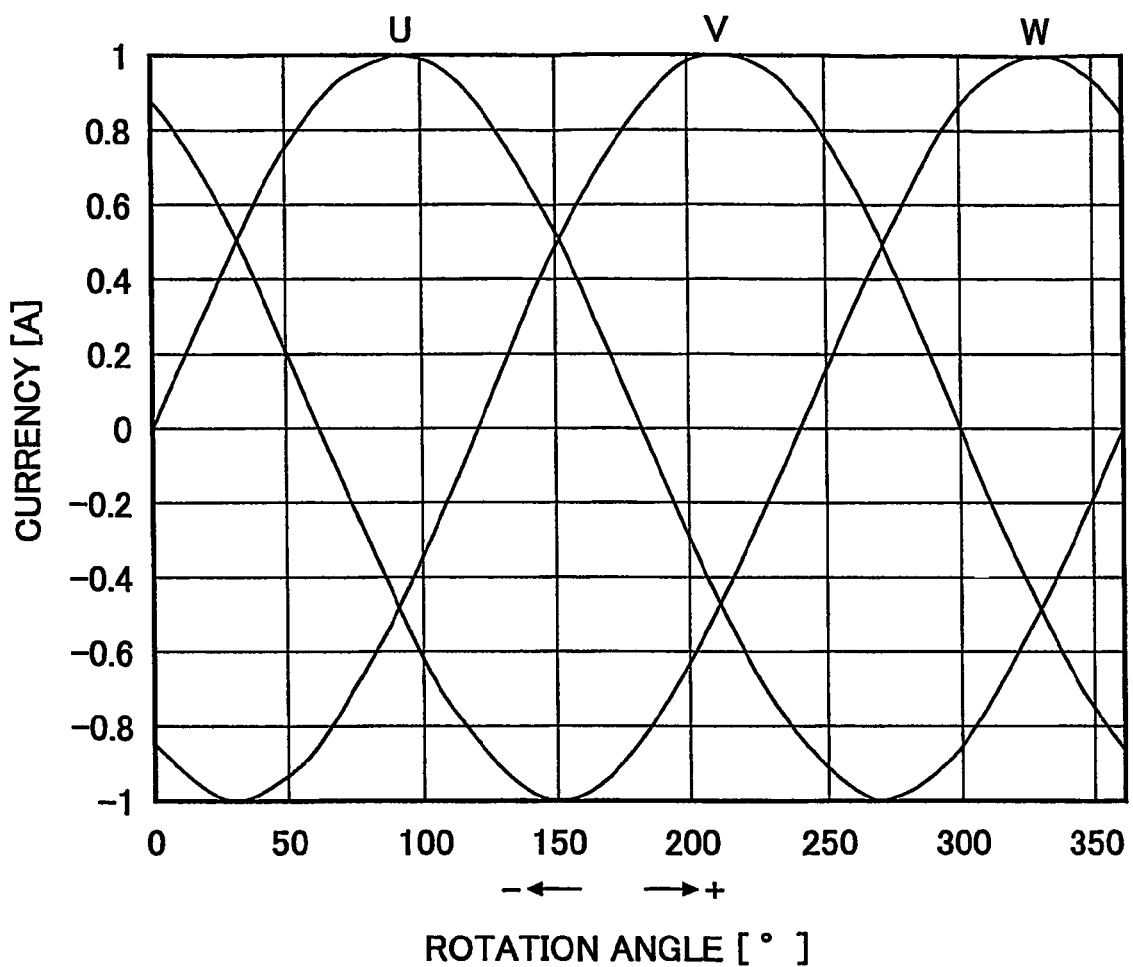
FIG. 4 is a graph showing an example pattern of the power supply control to the three-phase electric motor.

Also, the three-phase brushless motor 105 rotates in accordance with an example pattern of the power supply shown in FIG. 4. Specifically, the three-phase brushless motor 105 rotates in the forward (+) direction by supplying the power to the U phase→the V phase→the W phase in this order and rotates in the reverse (−) direction by supplying the power to the U phase→the W phase→the V phase in this order.

Figure 3B:
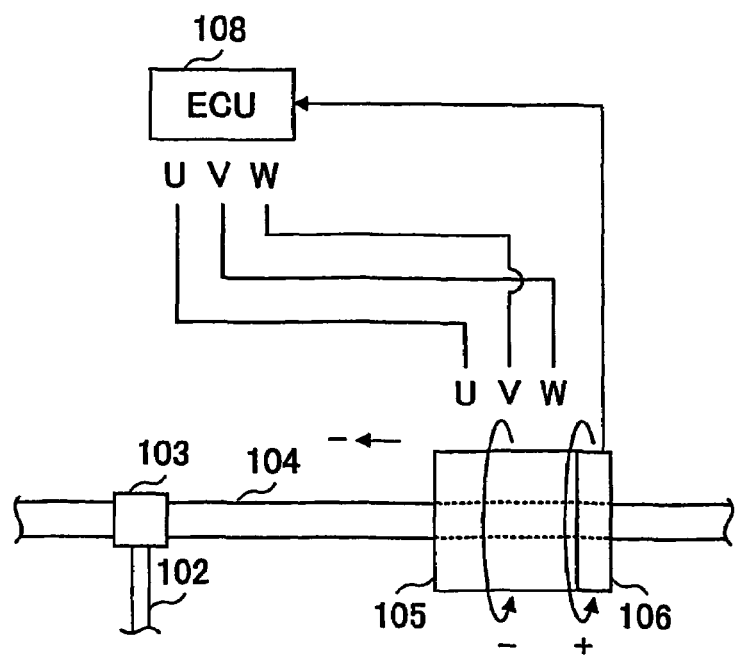
FIG. 3B is a schematic view partially showing the electric power steering apparatus installed on the left-hand-drive vehicle in accordance with the method of Embodiment 2 of this invention.

FIG. 3B is the partially enlarged figure showing the electric power steering apparatus installed on the left-hand-drive vehicle, using the installation method of this embodiment.

As shown in FIG. 3, in the installation method of this embodiment, the electric motor 105 is mirror-reversed as before, whereas the rotation angle sensor 106 is not mirror-reversed and is arranged in a consistent direction relative to the rack shaft 104. Therefore, when the electric motor 105 rotates in the reverse (−) direction, the rotation angle sensor 106 detects that the electric motor 105 rotates in the forward (+) direction.

Further, as shown in FIG. 3B, among electric wiring connecting the ECU 108 and the electric motor 105, the electric lines for the V phase and for the W phase are counterchanged (mutually switched at one end) in this embodiment. Therefore, when the ECU 108 intends to rotate the electric motor 105 in the forward (+) direction and supplies the power to the U phase→the V phase→the W phase in this order, the power is actually supplied to the U phase→the W phase→the V phase of the electric motor 105 in this order and the electric motor 105 rotates in the reverse (−) direction.

Therefore, under the installation circumstances shown in FIG. 3B, when steering in the forward (+) direction (to the left), the ECU 108 acts to supply the power to the U phase→the V phase→the W phase of the electric motor 105 in this order. Due to counterchanging of the electric lines, the power is actually supplied to the U phase→the W phase→the V phase of the electric motor 105 in this order, and the electric motor 105 rotates in the reverse (−) direction. By the mirror-reversed arrangement of the electric motor 105, the rotation of the electric motor 105 in the reverse (−) direction assists the rack shaft 104 to move to the left, which is a proper direction when steering to the left.

Also, this rotation of the electric motor 105 in the reverse (−) direction is detected by the rotation angle sensor 106, which is not mirror-reversed, as the rotation in the forward (+) direction. Therefore, the ECU 108 is informed from the rotation angle sensor 106 that the electric motor 105 rotates in the forward (+) direction, so that the ECU 108 recognizes that the actual direction of rotation of the electric motor 105 is coincident with the direction intended by the ECU 108.

Thus, the rack shaft 104 is properly assisted to move to the left when steering to the left, even though the same ECU as is installed on the right-hand-drive vehicle is employed when installed on the left-hand-drive vehicle. It can be understood by persons skilled in the art that this is also true when steering to the right, i.e., that the rack shaft 104 is properly assisted to move to the right when steering to the right.

Thus, according to this embodiment, the electric power steering apparatus can employ the common ECU both when installed on the right-hand-drive vehicle and when installed on the left-hand-drive vehicle.

Figure 5:
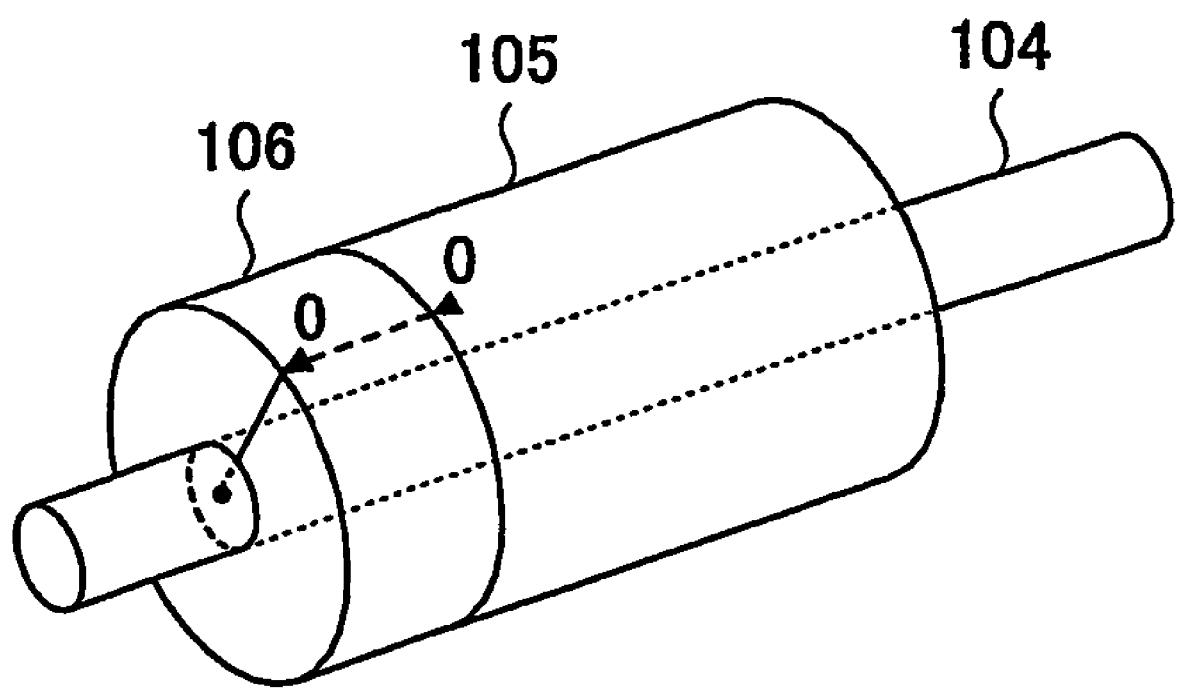
FIG. 5 is a schematic view showing the positional relationship between the electric motor and the rotation angle sensor in the circumstances where the electric power steering apparatus is installed on the right-hand-drive vehicle.

Embodiment 3 of this invention is next described with reference to FIGS. 5 and 6. In this embodiment, just as before, the electric motor 105 is a three-phase brushless motor with the U phase, the V phase, and the W phase, as shown in the FIG. 3A, which is the partially enlarged figure of FIG. 1. Further, as before, this three-phase brushless motor 105 rotates in accordance with the example pattern of the power supply shown in FIG. 4.

Figure 6A:
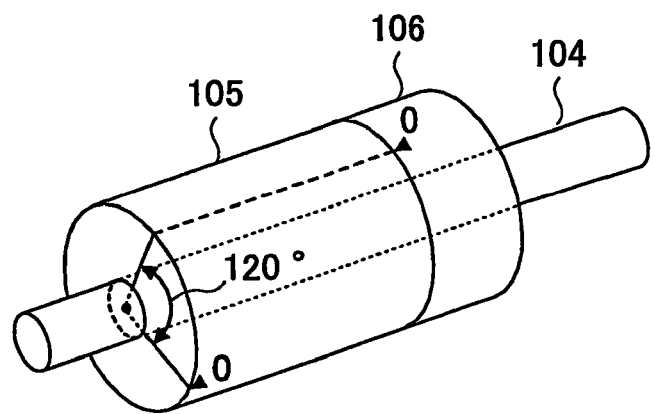
FIG. 6A is a schematic view showing the positional relationship between the electric motor and the rotation angle sensor in the circumstances where the electric power steering apparatus is installed on the left-hand-drive vehicle in accordance with the method of Embodiment 3 of this invention.
Figure 6B:
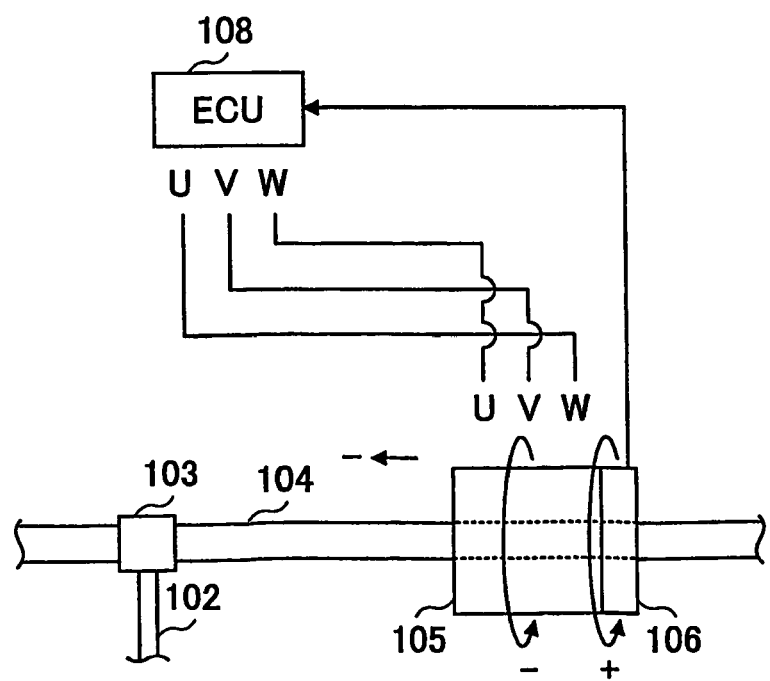
FIG. 6B is a schematic view partially showing the electric power steering apparatus installed on the left-hand-drive vehicle in accordance with the method of Embodiment 3 of this invention.

FIG. 6B is a partially enlarged figure showing the electric power steering apparatus installed on a left-hand-drive vehicle, using the installation method of this embodiment.

As shown in FIG. 6B, in the installation method of this embodiment, the electric motor 105 is mirror-reversed as before, whereas the rotation angle sensor 106 is not mirror-reversed and is arranged in a consistent direction relative to the rack shaft 104. Therefore, when the electric motor 105 rotates in the reverse (−) direction, the rotation angle sensor 106 detects that the electric motor 105 rotates in the forward (+) direction.

Further, the rotation angle sensor 106 is arranged with −120° offset relative to the electric motor 105. More specifically, 0° point of rotation of the electric motor 105 is coincident with 0° point of the rotation angle sensor 106 when installed on the right-hand-drive vehicle as shown in FIG. 5, whereas the 0° point of the rotation angle sensor 106 is offset by −120° (or +240°) relative to the 0° point of the electric motor 105 when installed on the left-hand-drive vehicle as shown in FIG. 6A. In this context, +/− directions in the angles correspond to the +/− directions of rotation of the electric motor 105 described above.

Therefore, if the rotation angle sensor 106 is arranged with the 0° point offset in this manner, when the power is supplied to the U phase→the V phase→the W phase of the electric motor 105 in this order, the rotation angle sensor 106 detects that the power is supplied to the W phase→the U phase→the V phase of the electric motor 105 in this order.

Further, as shown in FIG. 6B, among the electric wiring connecting the ECU 108 and the electric motor 105, the electric lines for the U phase and for the W phase are counterchanged (mutually switched at one end) in this embodiment. Therefore, when the ECU 108 intends to rotate the electric motor 105 in the forward (+) direction and supplies the power to the U phase→the V phase→the W phase in this order, the power is actually supplied to the U phase→the W phase→the V phase of the electric motor 105 in this order and the electric motor 105 rotates in the reverse (−) direction.

Therefore, under the installation circumstances shown in FIG. 6B, when steering in the forward (+) direction (to the left), the ECU 108 acts to supply the power to the U phase→the V phase→the W phase of the electric motor 105 in this order. Due to counterchanging of the electric lines, the power is actually supplied to the W phase→the V phase→the U phase of the electric motor 105 in this order, and the electric motor 105 rotates in the reverse (−) direction. By the mirror-reversed arrangement of the electric motor 105, the rotation of the electric motor 105 in the reverse (−) direction assists the rack shaft 104 to move to the left, which is the proper direction when steering to the left.

Also, this rotation of the electric motor 105 in the reverse (−) direction is detected by the rotation angle sensor 106, which is not mirror-reversed, as the rotation in the forward (+) direction. Therefore, the ECU 108 is informed from the rotation angle sensor 106 that the electric motor 105 rotates in the forward (+) direction, so that the ECU 108 recognizes that the actual direction of rotation of the electric motor 105 is coincident with the direction intended by the ECU 108.

Further, the power supply to the W phase→the V phase→the U phase of the electric motor 105 in this order is detected by the rotation angle sensor 106, which is arranged with −120° offset, as the power supply to the U phase→the W phase→the V phase of the electric motor 105 in this order. This detected power supply is then reported to the ECU 108. Therefore, the ECU 108 does not recognize a phase offset in the power supply pattern caused by counterchanging the U phase and the W phase.

Thus, the rack shaft 104 is properly assisted to move to the left when steering to the left, even though the same ECU as is installed on the right-hand-drive vehicle is used when installed on the left-hand-drive vehicle. It can be understood by persons skilled in the art that this is also true when steering to the right, i.e., that the rack shaft 104 is properly assisted to move to the right when steering to the right.

Thus, according to this embodiment, the electric power steering apparatus can employ the common ECU both when installed on the right-hand-drive vehicle and when installed on the left-hand-drive vehicle.

Embodiment 4 of this invention is next described with reference to FIG. 7. This embodiment is basically similar to the above-described Embodiment 3. However, the electric lines to the electric motor to be counterchanged and the angle by which the rotation angle sensor is offset in this embodiment are different from Embodiment 3. In this embodiment, just as before, the electric motor 105 is a three-phase brushless motor with the U phase, the V phase, and the W phase, as shown in the FIG. 7B, which is the partially enlarged figure of FIG. 1. Further, as before, this three-phase brushless motor 105 rotates in accordance with the example pattern of the power supply shown in FIG. 4.

Figure 7A:
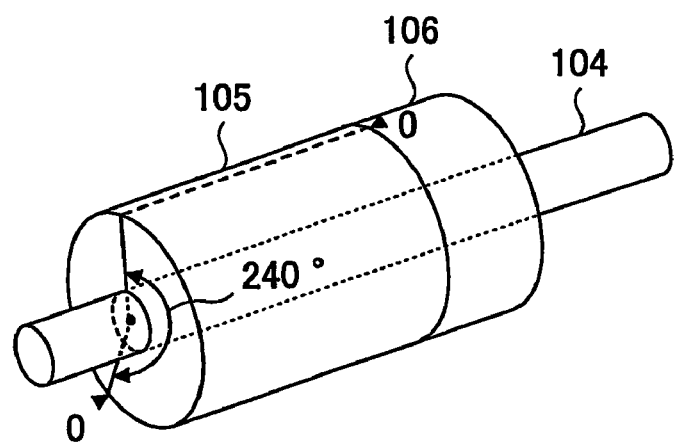
FIG. 7A is a schematic view showing the positional relationship between the electric motor and the rotation angle sensor in the circumstances where the electric power steering apparatus is installed on the left-hand-drive vehicle in accordance with the method of Embodiment 4 of this invention.
Figure 7B:
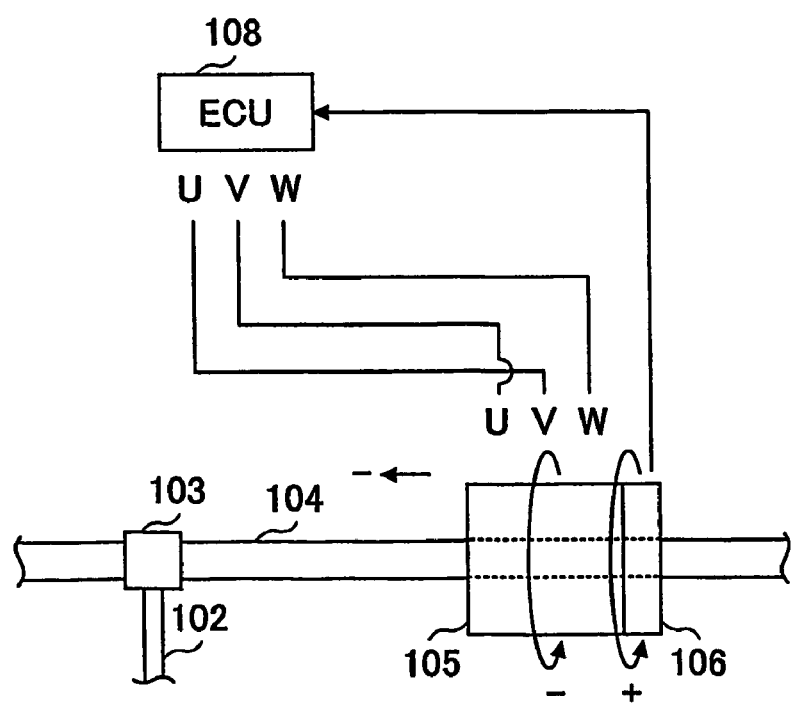
FIG. 7B is a schematic view partially showing the electric power steering apparatus installed on the left-hand-drive vehicle in accordance with the method of Embodiment 3 of this invention.

FIG. 7B is a partially enlarged figure showing the electric power steering apparatus installed on a left-hand-drive vehicle, using the installation method of this embodiment.

As shown in FIG. 7B, in the installation method of this embodiment, the electric motor 105 is mirror-reversed as before, whereas the rotation angle sensor 106 is not mirror-reversed and is arranged in a consistent direction relative to the rack shaft 104. Therefore, when the electric motor 105 rotates in the reverse (−) direction, the rotation angle sensor 106 detects that the electric motor 105 rotates in the forward (+) direction.

Further, the rotation angle sensor 106 is arranged with −240° offset relative to the electric motor 105. More specifically, the 0° point of rotation of the electric motor 105 is coincident with the 0° point of the rotation angle sensor 106 when installed on the right-hand-drive vehicle as shown in FIG. 7 (a), whereas the 0° point of the rotation angle sensor 106 is offset by −240° (or +120°) relative to the 0° point of the electric motor 105 when installed on the left-hand-drive vehicle as shown in FIG. 7A. In this context, +/− directions in the angles correspond to the +/− directions of rotation of the electric motor 105 described above.

Therefore, if the rotation angle sensor 106 is arranged with the 0° point offset in this manner, when the power is supplied to the U phase→the V phase→the W phase of the electric motor 105 in this order, the rotation angle sensor 106 detects that the power is supplied to the V phase→the W phase→the U phase of the electric motor 105 in this order.

Further, as shown in FIG. 7B, among the electric wiring connecting the ECU 108 and the electric motor 105, the electric lines for the U phase and for the V phase are counterchanged in this embodiment. Therefore, when the ECU 108 intends to rotate the electric motor 105 in the forward (+) direction and supplies the power to the U phase→the V phase→the W phase in this order, the power is actually supplied to the V phase→the U phase→the W phase of the electric motor 105 in this order and the electric motor 105 rotates in the reverse (−) direction.

Therefore, under the installation circumstances shown in FIG. 7B, when steering in the forward (+) direction (to the left), the ECU 108 acts to supply the power to the U phase→the V phase→the W phase of the electric motor 105 in this order. Due to counterchanging of the electric lines, the power is actually supplied to the V phase→the U phase→the W phase of the electric motor 105 in this order, and the electric motor 105 rotates in the reverse (−) direction. By the mirror-reversed arrangement of the electric motor 105, the rotation of the electric motor 105 in the reverse (→) direction assists the rack shaft 104 to move to the left, which is the proper direction when steering to the left.

Also, this rotation of the electric motor 105 in the reverse (−) direction is detected by the rotation angle sensor 106, which is not mirror-reversed, as the rotation in the forward (+) direction. Therefore, the ECU 108 is informed from the rotation angle sensor 106 that the electric motor 105 rotates in the forward (+) direction, so that the ECU 108 recognizes that the actual direction of rotation of the electric motor 105 is coincident with the direction intended by the ECU 108.

Further, the power supply to the V phase→the U phase→the W phase of the electric motor 105 in this order is detected by the rotation angle sensor 106, which is arranged with −240° offset, as the power supply to the U phase→the W phase→the V phase of the electric motor 105 in this order. This detected power supply is then reported to the ECU 108. Therefore, the ECU 108 does not recognize a phase offset in the power supply pattern caused by counterchanging the U phase and the V phase.

Thus, the rack shaft 104 is properly assisted to move to the left when steering to the left, even though the same ECU as is installed on the right-hand-drive vehicle is used when installed on the left-hand-drive vehicle. It can be understood by persons skilled in the art that this is also true when steering to the right, i.e., that the rack shaft 104 is properly assisted to move to the right when steering to the right.

Thus, according to this embodiment, the electric power steering apparatus can employ the common ECU both when installed on the right-hand-drive vehicle and when installed on the left-hand-drive vehicle.

Figure 8A:
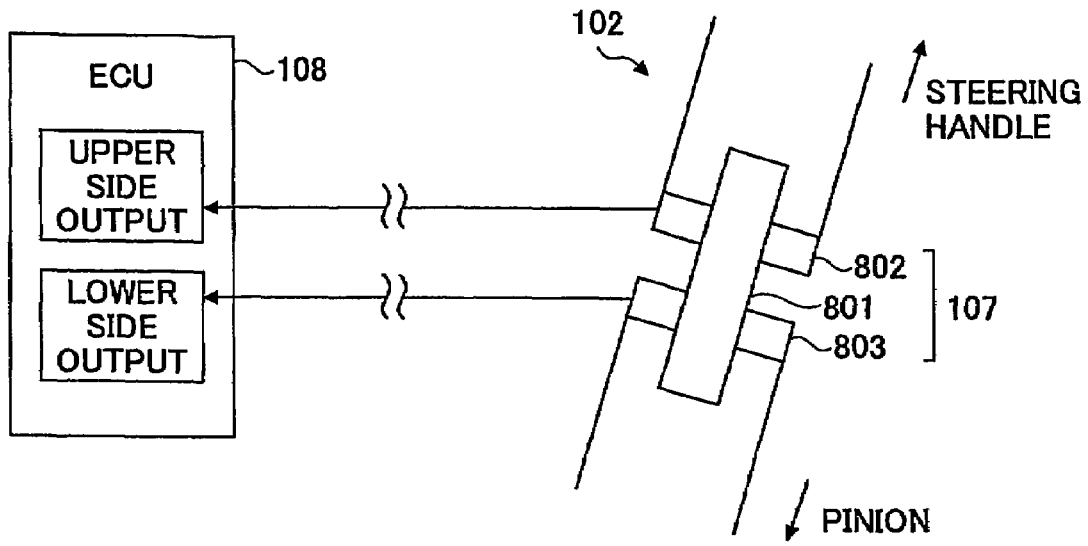
FIG. 8A is a schematic view showing a steering torque sensor section of the electric power steering apparatus.

Embodiment 5 of this invention is next described with reference to FIG. 8. In this embodiment, the steering torque sensor 107 provided on the steering shaft 102 consists of, as shown in FIG. 8A, a torsion bar 801 and upper and lower rotation angle sensors 802 and 803, and the ECU 108 detects the steering torque on the basis of difference in absolute angles between outputs from the upper and lower rotation angle sensors 802 and 803 and of torsion characteristics of the torsion bar 801.

Figure 8B:
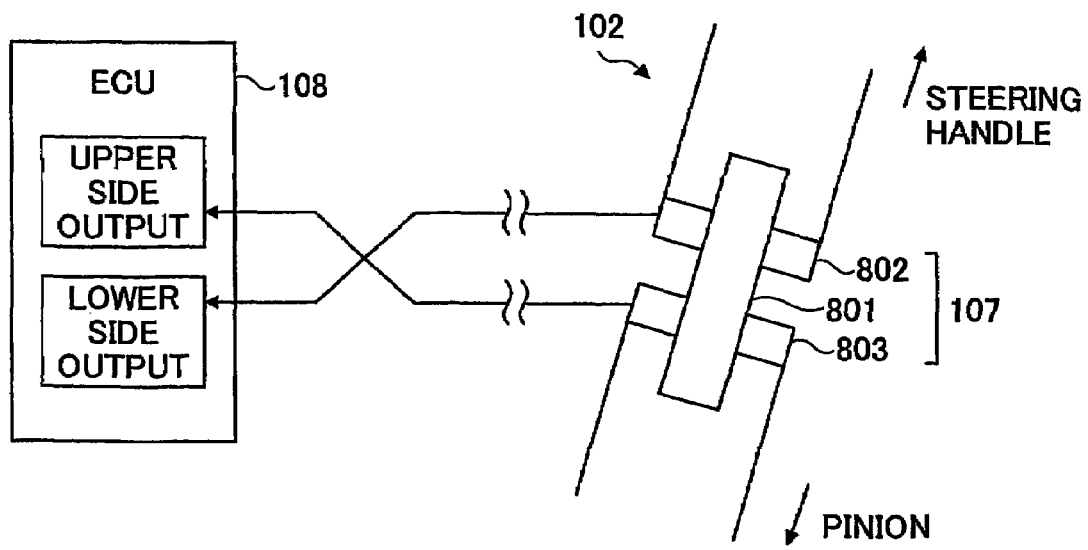
FIG. 8B is a schematic view showing the steering torque sensor section of the electric power steering apparatus installed on a left-hand-drive vehicle in accordance with the method of Embodiment 5 of this invention.

In this embodiment, when installed on the left-hand-drive vehicle, as shown in FIG. 8B, the electric lines are counterchanged such that the output from the upper rotation angle sensor 802 is transferred to the ECU 108 as if it is output from the lower rotation angle sensor 803 and the output from the lower rotation angle sensor 803 is transferred to the ECU 108 as if it is output from the upper rotation angle sensor 802.

Consequently, this causes the ECU 108 to recognize that the torsion bar 801 rotates in an opposite direction with an actual difference in angle between the outputs from the upper and lower rotation angle sensors 802 and 803. In other words, the ECU 108 recognizes steering in the opposite direction with the actual amount of the steering torque and controls the power supply to the electric motor 105 on the basis of such recognition.

Figure 2:
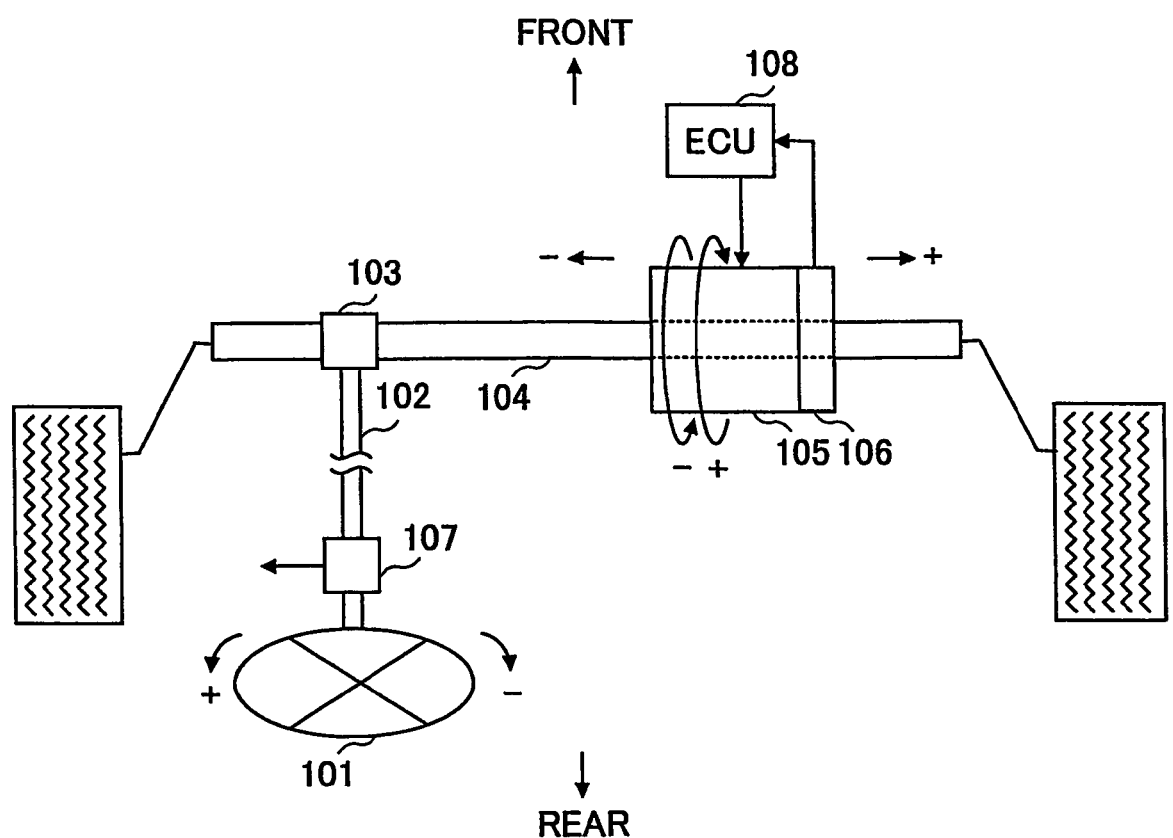
FIG. 2 is a schematic view showing the rack assist electric power steering apparatus installed on a left-hand-drive vehicle.

As described above, when installed on the left-hand-drive vehicle, the correspondence between the steering direction of the steering handle 101 and the direction of the assist force from the electric motor 105 is counterchanged because of the mirror-reversed arrangement (see FIG. 2). Therefore, to inform the ECU 108 of the steering torque with the opposite direction in the above-described manner, the rack shaft 104 is assisted to the left when steering to the left and to the right when steering to the right.

Thus, the rack shaft 104 is properly assisted to move to the left when steering to the left, even though the same ECU as is installed on the right-hand-drive vehicle is employed when installed on the left-hand-drive vehicle. It can be understood by persons skilled in the art that this is also true when steering to the right, i.e., that the rack shaft 104 is properly assisted to move to the right when steering to the right.

Thus, according to this embodiment, the electric power steering apparatus can employ the common ECU both when installed on the right-hand-drive vehicle and when installed on the left-hand-drive vehicle.

In any of the above Embodiments, the same ECU can be employed in the electric power steering apparatus for both the right-hand-drive vehicle and the left-hand-drive vehicle. Therefore, it is not necessary to provide two types of ECUs separately, thereby avoiding installing the incorrect ECU to cause the rack shaft 104 be assisted in the reverse direction.

Also, it is not necessary to provide two types of software for use in the right-hand-drive vehicle and in the left-hand-drive vehicle, to install them into the ECU 108, and to obtain information on the steering handle from the vehicle after the installation in order to use the appropriate software. Therefore, the electric power steering apparatus can avoid being out of control even when the EEPROM for loading the information about the steering handle from the vehicle fails.

Components other than the ECU in the electric power steering apparatus can be designed such that it is structurally difficult to incorrectly install those components on the vehicle. Therefore, with any of the above Embodiments, the incorrect installations can be significantly reduced.

By the way, in the above description of Embodiments of this invention, the rack assist electric power steering apparatus is taken as an example. However, it can be understood by persons skilled in the art that this invention can be also used in a column assist electric power steering apparatus.

FIG. 9 schematically shows the column assist electric power steering apparatus installed on a vehicle. In the column assist electric power steering apparatus, the electric motor 105 is installed on the steering column. A worm gear 901 located coaxially with the electric motor 105 is engaged with a worm wheel (reduction gear) 902 located coaxially with the steering shaft 102. Therefore, rotating the electric motor 105 generates an assist torque (rotation) on the steering shaft 102.

Figure 9A:
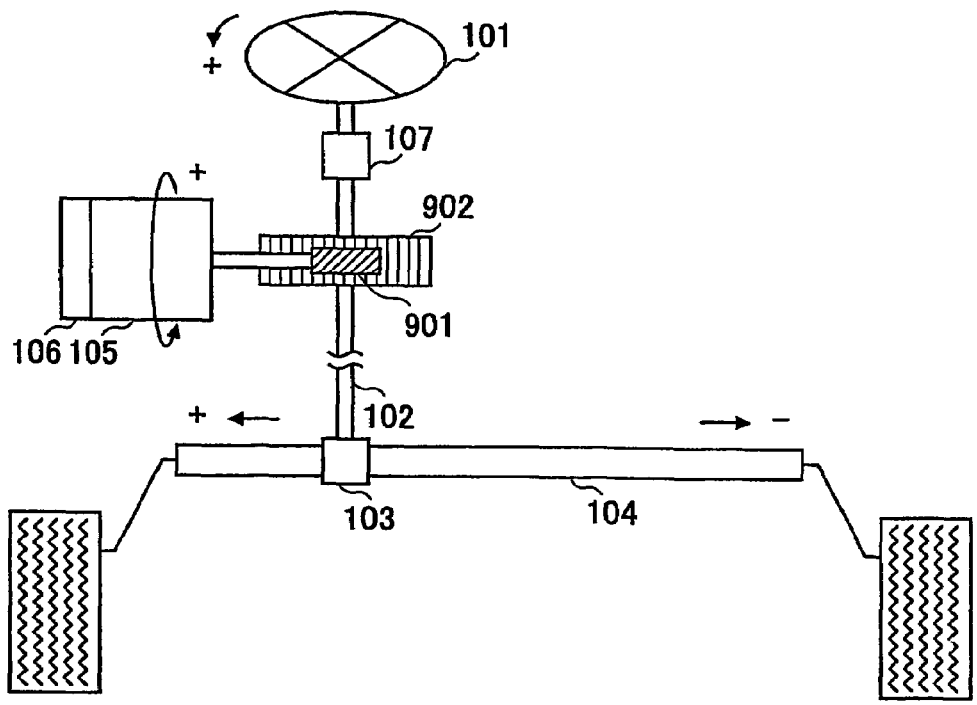
FIG. 9A is a schematic view showing the column assist electric power steering apparatus installed on a left-hand-drive vehicle.
Figure 9B:
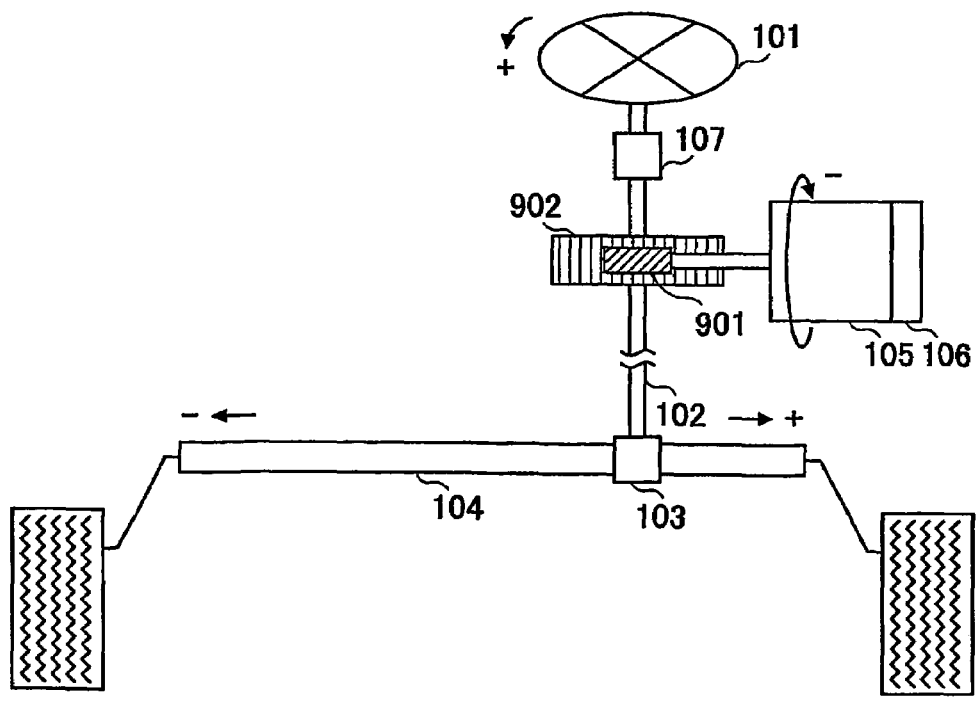
FIG. 9B is a schematic view showing the column assist electric power steering apparatus installed on a right-hand-drive vehicle.

FIGS. 9A and 9B show such a column assist electric power steering apparatus installed on a right-hand-drive vehicle and on a left-hand-drive vehicle, respectively. As shown, as in the rack assist electric power steering apparatus, the column assist electric power steering apparatus is mirror-reversed between when installed on the right-hand-drive vehicle (FIG. 9A) and when installed on the left-hand-drive vehicle (FIG. 9B) for appropriate installation.

As can be seen in the drawings, as in the rack assist electric power steering apparatus, if the worm gear 901 is either right-handed or left-handed, the direction of rotation of the motor is reversed by the mirror-reversed arrangement and it becomes necessary to provide two separate ECUs.

Such condition is the same as in the rack assist electric power steering apparatus described above, thereby this invention is applicable to solve it. More specifically, when the column assist electric power steering apparatus designed for use in the right-hand-drive vehicle is installed on the left-hand-drive vehicle and when the column assist electric power steering apparatus designed for use in the left-hand-drive vehicle is installed on the right-hand-drive vehicle, the correspondence between the direction of steering and the direction of the generated assist force can be reversed by the same methods as in Embodiments 1-5 of this invention.

The embodiments according to this invention are described above with taking the cases where the electric power steering apparatus designed for use in the right/left-hand-drive vehicle is installed on the left/right-hand-drive vehicle, respectively, for illustration.

However, application of this invention is not limited to such cases. For example, there can be two types of vehicles where a steering gearbox is located forward of the central wheel axis in one type of vehicle and the steering gearbox is located rearward of the central wheel axis in the other type of vehicle. Positional relationships among the central wheel axis, the rack axis, and the pinion in both types are schematically described in FIGS. 10A and (*b*).

Figure 10A:
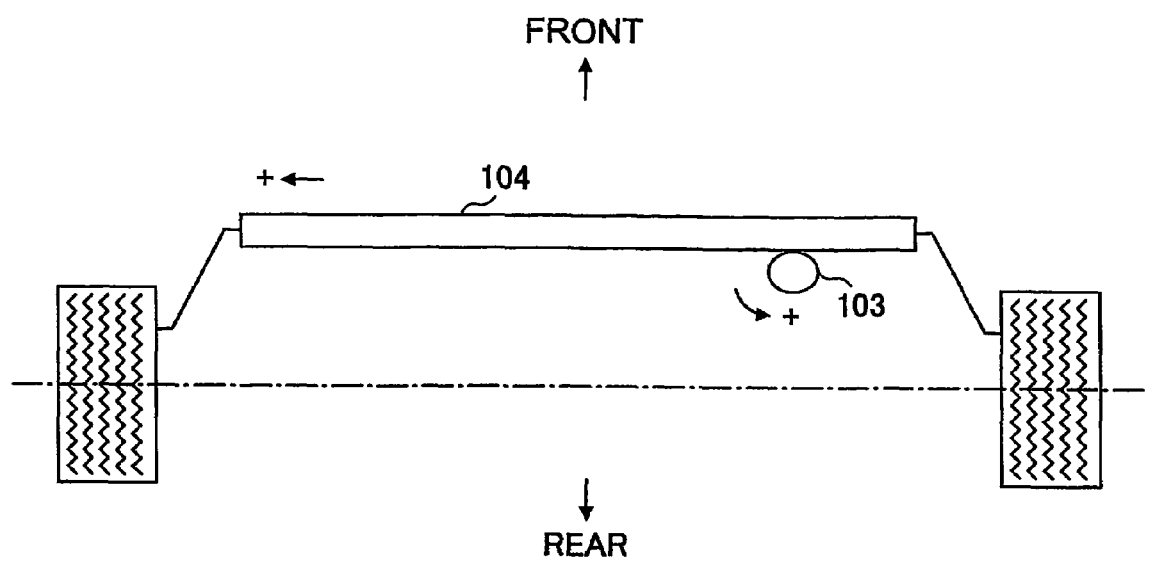
FIG. 10A is a schematic view showing the positional relationship in the circumstances where the steering gearbox is located forward of the central wheel axis.
Figure 10B:
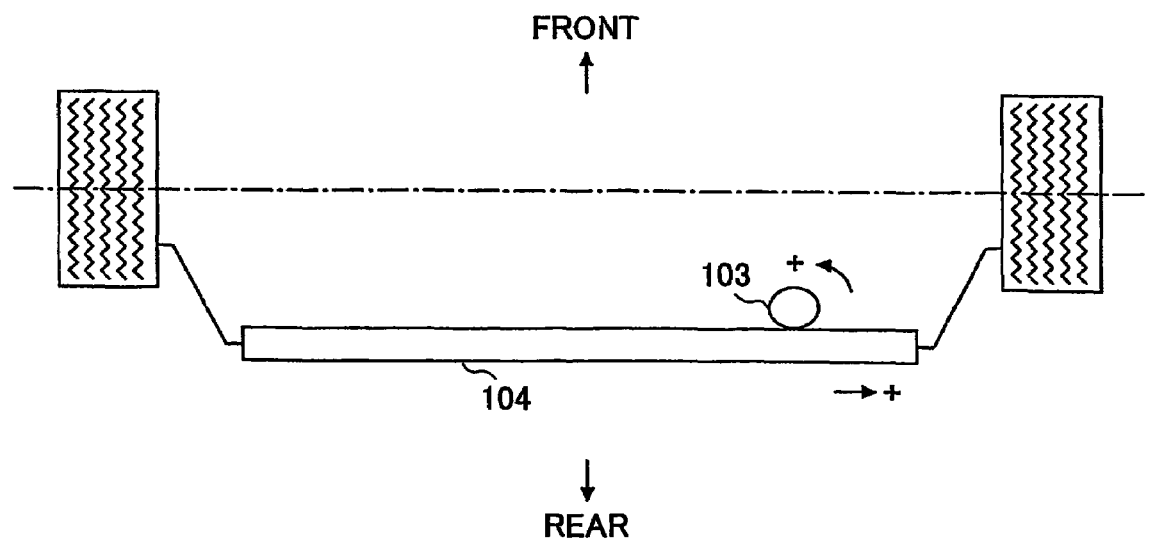
FIG. 10B is a schematic view showing the positional relationship in the circumstances where the steering gearbox is located rearward of the central wheel axis.

FIG. 10A shows the case where the steering gearbox is located forward of the central wheel axis, while FIG. 10B shows the case where the steering gearbox is located rearward of the central wheel axis. As shown, for each type, the rack shaft 104 moves to the opposite direction when the pinion part 103 is rotated in the same direction with the steering handle 101 (not shown).

Figure 11A:
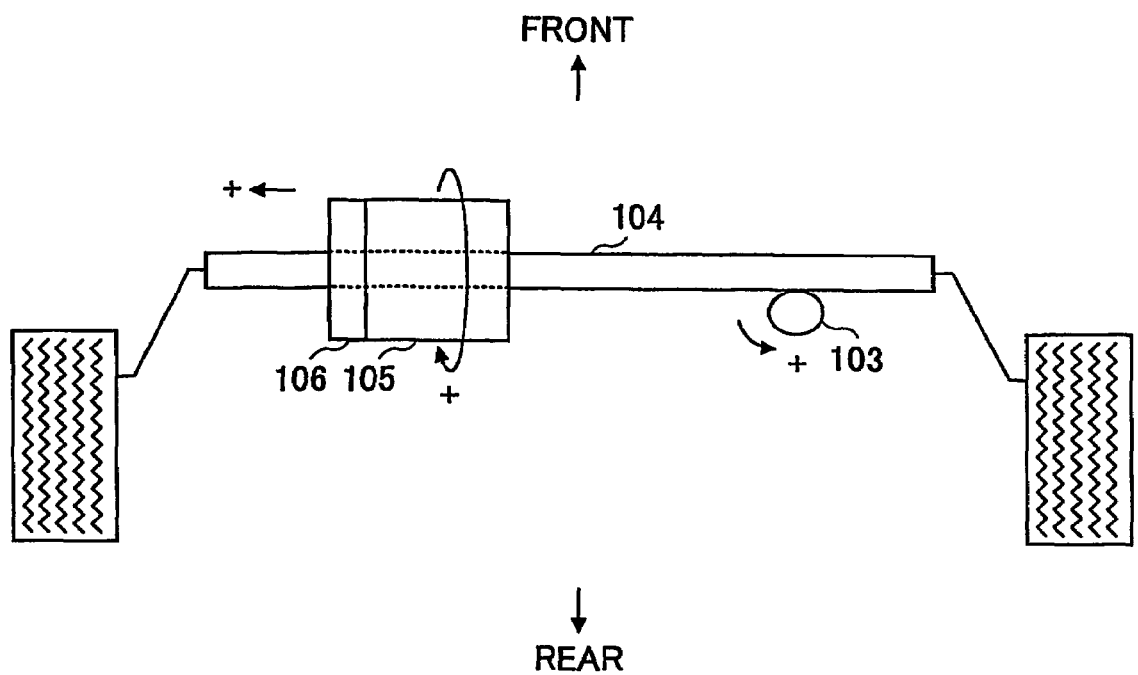
FIG. 11A is a schematic view showing the electric motor being located coaxially with the rack of the vehicle of which steering gearbox is located forward of the central wheel axis.
Figure 11B:
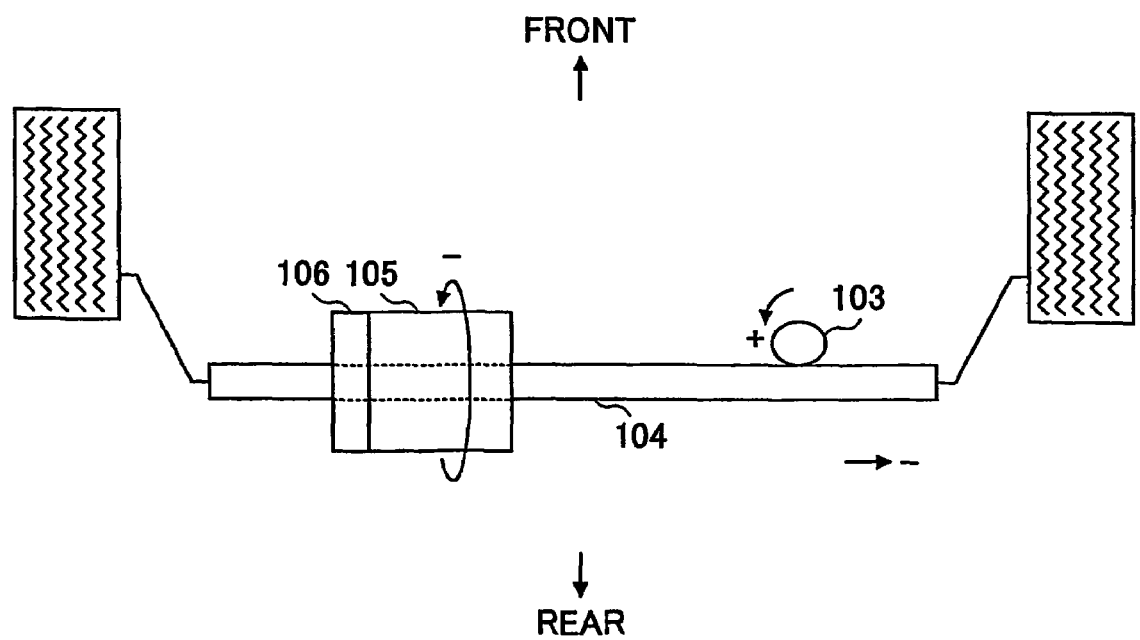
FIG. 11B is a schematic view showing the electric motor being located coaxially with the rack of the vehicle of which steering gearbox is located rearward of the central wheel axis.

Therefore, in the case where the rack assist electric power steering apparatus is installed on either of the vehicles having a different gearbox location, as shown in FIGS. 11A and 11B, it is necessary to reverse the direction of rotation of the motor in accordance with the gearbox location even though both of the vehicles are right-hand-drive vehicles.

Such condition is the same as in the right/left-hand-drive vehicles described above, therefore this invention is applicable to solve it. More specifically, when the electric power steering apparatus designed for use in the vehicle of which gearbox is located forward of the central wheel axis is installed on the vehicle of which gearbox is located rearward of the central wheel axis, and when the electric power steering apparatus designed for use in the vehicle of which gearbox is located rearward of the central wheel axis is installed on the vehicle of which gearbox is located forward of the central wheel axis, the correspondence between the direction of steering and the direction of the generated assist force can be reversed by the same methods as in Embodiments 1-5 of this invention.

Thus, according to this invention, in any of the cases described above, only one type of ECU has to be provided.

More specifically, this invention provides the electric power steering apparatus and the installation method of the same to enable employing a common electric control unit that controls the power supply to the electric motor for generating the assist force both when installed on the right-hand-drive vehicle and when installed on the left-hand-drive vehicle, or both when installed on the vehicle of which steering gear box is located forward of the central wheel axis and when installed on the vehicle of which steering gearbox is located rearward of the central wheel axis.

The invention claimed is:

1. A method for installing an electric power steering apparatus on a left-hand-drive vehicle or a right-hand-drive vehicle, the apparatus comprising a three-phase electric motor for generating an assist force for a turning operation of a steering handle to a rack shaft or column shaft; a rotation angle sensor for detecting a rotation angle of the three-phase electric motor; and an electrical control unit for controlling the power supply to the three-phase electric motor, the apparatus being installed on the left-hand-drive vehicle when the electrical control unit is designed for use in the right-hand-drive vehicle and on the right-hand-drive vehicle when the electrical control unit is designed for use in the left-hand-drive vehicle, comprising the steps of:
- mirror-reversing and arranging the apparatus except for the rotation angle sensor;
- arranging the rotation angle sensor in a consistent direction relative to the rack shaft or column shaft where the three-phase electric motor generates the assist force; and
- counterchanging the electric lines for V phase and for W phase of the three-phase electric motor before connecting.

2. A method for installing an electric power steering apparatus on a left-hand-drive vehicle or a right-hand-drive vehicle, the apparatus comprising a three-phase electric motor for generating an assist force for a turning operation of a steering handle to a rack shaft or column shaft; a rotation angle sensor for detecting a rotation angle of the three-phase electric motor; and an electrical control unit for controlling the power supply to the three-phase electric motor, the apparatus being installed on the left-hand-drive vehicle when the electrical control unit is designed for use in the right-hand-drive vehicle and on the right-hand-drive vehicle when the electrical control unit is designed for use in the left-hand-drive vehicle, comprising the steps of:
- mirror-reversing and arranging the apparatus except for the rotation angle sensor;
- arranging the rotation angle sensor in a consistent direction relative to the rack shaft or column shaft where the three-phase electric motor generates the assist force with +120° offset relative to the three-phase electric motor; and
- counterchanging the electric lines for U phase and for V phase of the three-phase electric motor before connecting.

3. A method for installing an electric power steering apparatus on a left-hand-drive vehicle or a right-hand-drive vehicle, the apparatus comprising a three-phase electric motor for generating an assist force for a turning operation of a steering handle to a rack shaft or column shaft; a rotation angle sensor for detecting a rotation angle of the three-phase electric motor; and an electrical control unit for controlling the power supply to the three-phase electric motor, the apparatus being installed on the left-hand-drive vehicle when the electrical control unit is designed for use in the right-hand-drive vehicle and on the right-hand-drive vehicle when the electrical control unit is designed for use in the left-hand-drive vehicle, comprising the steps of:
- mirror-reversing and arranging the apparatus except for the rotation angle sensor;
- arranging the rotation angle sensor in a consistent direction relative to the rack shaft or column shaft where the three-phase electric motor generates the assist force with +240° offset relative to the three-phase electric motor; and
- counterchanging the electric lines for U phase and for W phase of the three-phase electric motor before connecting.

4. A method for installing an electric power steering apparatus on a left-hand-drive vehicle or a right-hand-drive vehicle, the apparatus comprising an electric motor for generating an assist force for a turning operation of a steering handle to a rack shaft or column shaft; and an electrical control unit for controlling the power supply to the electric motor, the apparatus being installed on the left-hand-drive vehicle when the electrical control unit is designed for use in the right-hand-drive vehicle and on the right-hand-drive vehicle when the electrical control unit is designed for use in the left-hand-drive vehicle, comprising the steps of:
- mirror-reversing and arranging the apparatus; and
- replacing a reduction gear provided on the electric motor with another one being opposite-handed.

5. A method for installing an electric power steering apparatus on a left-hand-drive vehicle or a right-hand-drive vehicle, the apparatus comprising an electric motor for generating an assist force for a turning operation of a steering handle to a rack shaft or column shaft; a torsion bar mounted on a shaft for transferring the turning operation of the steering handle and configured to be twisted by the turning operation; and upper and lower angle sensors mounted on an upper side and on a lower side of the torsion bar, respectively, and configured to detect absolute angles and transfer them to the electric control unit, the apparatus being installed on the left-hand-drive vehicle when the electrical control unit is designed for use in the right-hand-drive vehicle and on the right-hand-drive vehicle when the electrical control unit is designed for use in the left-hand-drive vehicle, comprising the steps of:
- mirror-reversing and arranging the apparatus; and
- counterchanging an electric line connecting the upper angle sensor and the electric control unit and an electric line connecting the lower angle sensor and the electric control unit.

6. A method for installing an electric power steering apparatus on a left-hand-drive vehicle or a right-hand-drive vehicle, the apparatus comprising a three-phase electric motor for generating an assist force for a turning operation of a steering handle to a rack shaft or column shaft; a rotation angle sensor for detecting a rotation angle of the three-phase electric motor; and an electrical control unit for controlling the power supply to the three-phase electric motor, the apparatus being installed on the vehicle of which gearbox is located forward of the central wheel axis when the electrical control unit is designed for use in the vehicle of which gearbox is located rearward of the central wheel axis, and on the vehicle of which gearbox is located rearward of the central wheel axis when the electrical control unit is designed for use in the vehicle of which gearbox is located forward of the central wheel axis, comprising the steps of:
- mirror-reversing and arranging the apparatus except for the rotation angle sensor;
- arranging the rotation angle sensor in a consistent direction relative to the rack shaft or column shaft where the three-phase electric motor generates the assist force; and
- counterchanging the electric lines for V phase and for W phase of the three-phase electric motor before connecting.

7. A method for installing an electric power steering apparatus on a left-hand-drive vehicle or a right-hand-drive vehicle, the apparatus comprising a three-phase electric motor for generating an assist force for a turning operation of a steering handle to a rack shaft or column shaft; a rotation angle sensor for detecting a rotation angle of the three-phase electric motor; and an electrical control unit for controlling the power supply to the three-phase electric motor, the apparatus being installed on the vehicle of which gearbox is located forward of the central wheel axis when the electrical control unit is designed for use in the vehicle of which gearbox is located rearward of the central wheel axis and on the vehicle of which gearbox is located rearward of the central wheel axis when the electrical control unit is designed for use in the vehicle of which gearbox is located forward of the central wheel axis, comprising the steps of:
- mirror-reversing and arranging the apparatus except for the rotation angle sensor;
- arranging the rotation angle sensor in a consistent direction relative to the rack shaft or column shaft where the three-phase electric motor generates the assist force with +120° offset relative to the three-phase electric motor; and
- counterchanging the electric lines for U phase and for V phase of the three-phase electric motor before connecting.

8. A method for installing an electric power steering apparatus on a left-hand-drive vehicle or a right-hand-drive vehicle, the apparatus comprising a three-phase electric motor for generating an assist force for a turning operation of a steering handle to a rack shaft or column shaft; a rotation angle sensor for detecting a rotation angle of the three-phase electric motor; and an electrical control unit for controlling the power supply to the three-phase electric motor, the apparatus being installed on the vehicle of which gearbox is located forward of the central wheel axis when the electrical control unit is designed for use in the vehicle of which gearbox is located rearward of the central wheel axis, and on the vehicle of which gearbox is located rearward of the central wheel axis when the electrical control unit is designed for use in the vehicle of which gearbox is located forward of the central wheel axis, comprising the steps of:
- mirror-reversing and arranging the apparatus except for the rotation angle sensor;
- arranging the rotation angle sensor in a consistent direction relative to the rack shaft or column shaft where the three-phase electric motor generates the assist force with +240° offset relative to the three-phase electric motor; and
- counterchanging the electric lines for U phase and for W phase of the three-phase electric motor before connecting.

9. A method for installing an electric power steering apparatus on a left-hand-drive vehicle or a right-hand-drive vehicle, the apparatus comprising an electric motor for generating an assist force for a turning operation of a steering handle to a rack shaft or column shaft; and an electrical control unit for controlling the power supply to the electric motor, the apparatus being installed on the vehicle of which gearbox is located forward of the central wheel axis when the electrical control unit is designed for use in the vehicle of which gearbox is located rearward of the central wheel axis, and on the vehicle of which gearbox is located rearward of the central wheel axis when the electrical control unit is designed for use in the vehicle of which gearbox is located forward of the central wheel axis, comprising the steps of:
- mirror-reversing and arranging the apparatus; and
- replacing a reduction gear provided on the electric motor with another one being opposite-handed.

10. A method for installing an electric power steering apparatus on a left-hand-drive vehicle or a right-hand-drive vehicle, the apparatus comprising an electric motor for generating an assist force for a turning operation of a steering handle to a rack shaft or column shaft; a torsion bar mounted on a shaft for transferring the turning operation of the steering handle and configured to be twisted by the turning operation; and upper and lower angle sensors mounted on an upper side and on a lower side of the torsion bar, respectively, and configured to detect absolute angles and transfer them to the electric control unit, the apparatus being installed on the vehicle of which gearbox is located forward of the central wheel axis when the electrical control unit is designed for use in the vehicle of which gearbox is located rearward of the central wheel axis and on the vehicle of which gearbox is located rearward of the central wheel axis when the electrical control unit is designed for use in the vehicle of which gearbox is located forward of the central wheel axis, comprising the steps of:
- mirror-reversing and arranging the apparatus; and
- counterchanging an electric line connecting the upper angle sensor and the electric control unit and an electric line connecting the lower angle sensor and the electric control unit.

\* \* \* \* \*